June 4, 1935. F. D. BRADDON ET AL 2,003,336
INDICATING DEVICE FOR FLAW DETECTOR MECHANISM
Filed Nov. 11, 1933   2 Sheets-Sheet 1
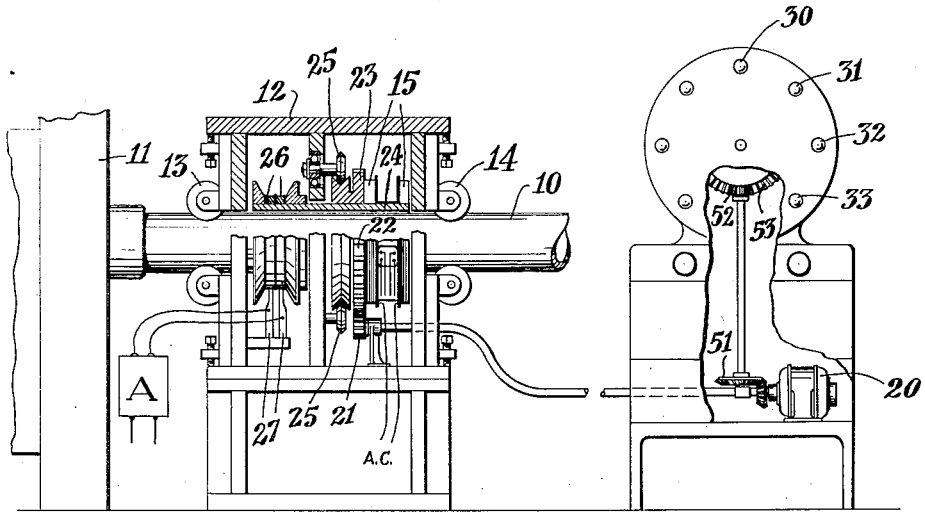
Inventors
FRED D. BRADDON &
ALFRED N. LAWRENCE June 4, 1935.　　F. D. BRADDON ET AL　　2,003,336
INDICATING DEVICE FOR FLAW DETECTOR MECHANISM
Filed Nov. 11, 1933　　2 Sheets-Sheet 2

Inventors
FRED D. BRADDON &
ALFRED N. LAWRENCE
By Joseph H. Lipschutz
Attorney

Patented June 4, 1935

2,003,336

UNITED STATES PATENT OFFICE 2,003,336

INDICATING DEVICE FOR FLAW DETECTOR MECHANISM

Fred D. Braddon, Eltingville, and Alfred N. Lawrence, Lawrence, N. Y., assignors to Sperry Products, Inc., Brooklyn, N. Y., a corporation of New York Application November 11, 1933, Serial No. 697,566

9 Claims. (Cl. 175—183)

This invention relates to flaw detector mechanism for tubular electrical conductors. More especially, it relates to the Sperry flaw detector mechanism for detecting flaws and eccentricities in the lead sheaths of power cables. Said mechanism is now well known for commercial purposes and consists of a device which responds to flaws and eccentricities in the lead sheath and is caused to make a record upon a moving chart to give a permanent indication of the condition of the cable under test.

It is a principal object of our invention to provide, in addition to the record heretofore obtained, or in lieu thereof, a visual indication which will not only indicate the presence of defects in the tubular conductor but will also give an indication as to their location on the circumference of the conductor.

It is a further object of our invention to provide visual indicating means as described above which will not only give the location of the defective portion of the tubular conductor but will also give an indication as to the degree or intensity of the defect.

Further objects and advantages of this invention will become apparent in the following detailed description.

In the accompanying drawings,

Fig. 1 is a front elevation, partly sectioned vertically, and with parts broken away showing an assembly of our invention applied to the Sperry cable testing device.

Fig. 2 is a perspective view, largely diagrammatic, illustrating the principle of the Sperry cable testing method.

Fig. 3 is a wiring diagram illustrating one form of our invention.

Figure 4:
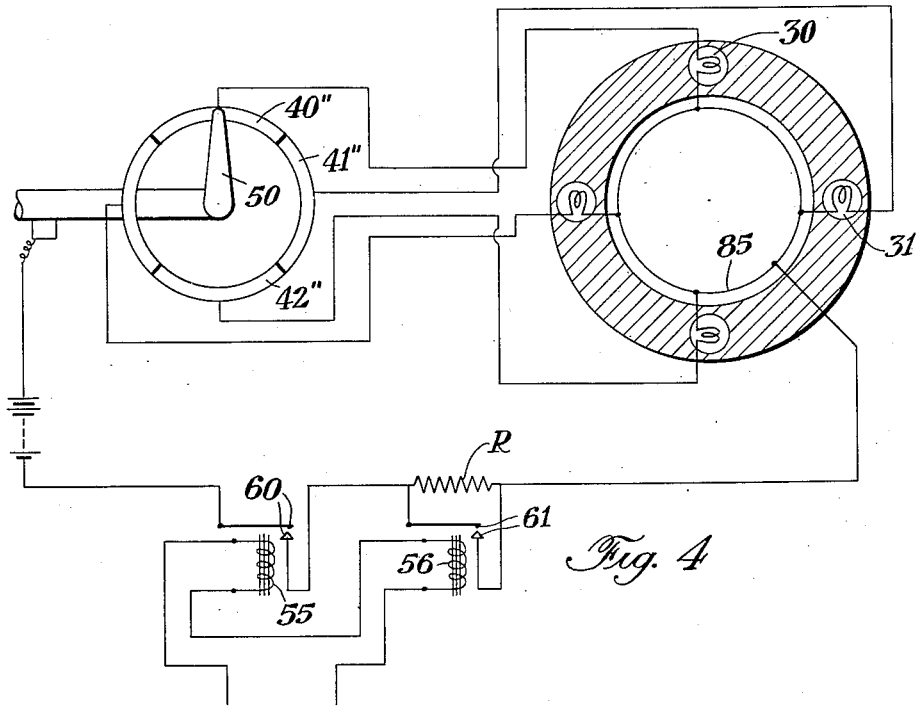
Fig. 4 is a view similar to Fig. 3 but indicating another form of our invention.

Referring first to Figs. 1 and 2, there is illustrated the mechanism constituting the Sperry lead sheath cable testing mechanism for detecting internal fissures and eccentricities in wall thickness in the lead sheaths of cables. The testing is performed on the cable 10 as it passes out of the lead press 11 which forms the lead sheath around the cable. The lead sheath covered cable 10 is then fed axially through the testing machine 12 by way of sets of guide rollers 13 and 14 and in its passage through the machine 12 current is supplied to the lead sheath as by means of coils 15 supplied from an A. C. source to send flux through the lead sheath. Sets of spaced contacts 16 and 17 are mounted in contact with the lead sheath and are designed to be rotated around the circumference of the sheath continuously as by means such as a motor 20 operating suitable gearing 21, 22, the gear 22 being fixed upon a hub 23 carried by a sleeve 24. Said sleeve surrounds the cable 10 and is held in constant relation thereto by means such as fixed guide rollers 25. Since the cable 10 travels axially and the contacts 16 and 17 travel circumferentially, the sets of contacts will trace a spiral path on the surface of the sheath. Any variations in flux in said sheath caused by flaws or eccentricities will cause a variation in the drop of potential between contacts 16 and 17 and such variations may be taken off slip rings 26 by means of brushes 27 and led to an amplifier A. Any variations in potential between contacts 16 and 17 above a predetermined value will cause the output from amplifier A to operate suitable indicating mechanism which has heretofore taken the form of pens operating on a moving chart. The output of the amplifier was caused to operate one or more relays of progressively increasing strength, so that the number of relays actuated was proportional to the degree of defect and said relays actuated their respective pens so that the number of pens actuated out of their normal position was an indication of the degree of defect.

It is the present object of our invention to provide in place of the type of indicator described above, or in addition thereto, a visual indicator which will not only indicate the presence of a defect but will give an indication of the location of that defect on the circumference of the lead sheath. One form of our invention for accomplishing this purpose is disclosed in Figs. 1 and 3. The visual indicating system may comprise a series of lamps 30, 31, 32, etc. distributed in a circle corresponding to the circumference of the tubular conductor under test. When a flaw is detected by the detector mechanism 16, 17, one of the lamps in a position corresponding to the position of the defect on the circumference of the tubular conductor 10 is adapted to be illuminated. This is accomplished as follows: We cause said lamps to be connected in parallel in a circuit provided with energy from any suitable source, such as battery B, and cause the circuit through each of said lamps to lie through a set of contacts such as contacts 40, 41, 42, etc. corresponding to lamps 30, 31, 32, etc. In Fig. 3 we have shown only three relays for three of the lamps, but it will be understood that a relay is provided for each lamp.

We cause the circuit through the proper lamp to be closed by energizing suitable relays 40′, 41′, 42′, etc. to close the respective contacts 40, 41, 42 to illuminate the lamp in the proper position by means of the following mechanism: We cause each of said relays 40′, 41′, 42′, etc. to lie in the circuit of suitable contact segments 40″, 41″, 42″, etc., one of said segments being provided corresponding to each of the lamps. A commutator contact 50 is caused to rotate in engagement with said contact segments and in synchronism with the rotation of contacts 16 and 17 by motor 20, so that there is always a definite relationship between the position of commutator contact 50 and the position of contacts 16 and 17. Any suitable synchronous driving mechanism may be employed, such as that shown, for instance, in Fig. 1, wherein the drive from motor 20 to sleeve 24 which carries contacts 16 and 17 also drives commutator contact 50 through suitable gearing 51, 52, 53, as shown in Fig. 1, so that commutator contact 50 makes one revolution for each revolution of sleeve 24 and hence of contacts 16 and 17. The circuit through commutator contact 50, contact segments 40″, 41″, etc., relays 40′, 41′, etc., is controlled by the output from the amplifier which is designed to energize one or more relays 55, 56, 57 of increasing strength so that if a region of weak flaw is encountered only one of said relays is actuated, but if a region of greater flaw is encountered, two or even three of said relays are actuated. The actuation of only one of said relays will close sets of contacts 60, while energization of additional relays will close sets of contacts 61 and 62 in addition. If any of the sets of contacts 60, 61, or 62 is closed, it will be seen that the circuit leading to relays 40′, 41′, 42′ is closed, but which of said relays will be energized, that is, which of said relays will have the circuit therethrough closed depends upon which commutator segment 40″, 41″, etc. is in engagement with commutator contact 50 at that particular time. Thus, for instance, let us say that when the commutator contact 50 is in the position shown in Fig. 3, an impulse from the output of the amplifier energizes relay 55 and closes contacts 60. It will now be seen that the circuit has been closed from commutator contact 50 through contact 60, lead 59, relay 41′, and contact segment 41″. Thus, only relay 41′ is energized by the output of the amplifier, and thus contacts 41 will be closed to illuminate the lamp to indicate that the flaw is located at that particular point on the circumference of the tubular conductor.

By the time commutator contact 50 has reached segment 42″, the output from the amplifier, which is practically instantaneous, has ceased, and therefore contacts 60 are no longer closed and the engagement of contact 50 with segment 42″ will not result in energizing relay 42′ or illuminating lamp 32. As a result only a very brief illumination of the lamp will be obtained. In order to prolong the energization of the illuminated lamp, the relays 40′, 41′, 42′, etc. are constructed as holding relays provided with blocks 54 of metal, such as copper, to cause the relay to continue to be energized for a considerable time after the contact 50 has passed beyond the respective contact segments, and thus to continue the illumination of the respective lamp which would otherwise be only instantaneous.

The relays 55, 56, and 57, being of increasing strength, can be caused to operate visual indicators to give an indication of the degree of the defect, in addition to the indication provided by the lamps 30, 31, etc. which indicates its location on the circumference. For this purpose, each relay 55, 56, 57 operates a respective armature 55′, 56′, 57′ to close the sets of contacts 60, 61, 62 to energize relays 70, 71, 72 which will attract their respective armatures 70′, 71′, 72′ to close the circuit through lamps 80, 81, and 82 which may be conveniently positioned adjacent the set of lamps 30, 31, 32, etc. so that both indications may be readily apparent to an operator.

Instead of employing two sets of lamps as shown in Fig. 3, one set 30, 31, 32, etc. to indicate the location of the defect and the other set 80, 81, 82, etc., for indicating the degree of flaw, we may utilize one set of lamps for accomplishing both purposes. This is illustrated in Fig. 4. The respective parts are similar to those shown in Fig. 3 and are similarly indicated. Thus, there is a series of lamps 30, 31, etc., controlled by commutator contact 50 operating on commutator segments 40″, 41″, etc. The output from the amplifier may be caused to energize a series of relays 55, 56 of increasing strength so that flaws of relatively low strength will actuate only relay 55 while flaws of greater intensity will actuate also relay 56. When the output from the amplifier due to a flaw energizes only relay 55, contacts 60 are closed to close a circuit extending through a resistance R to a common lead 85 to which all of the lamps are connected in parallel, the circuit through the lamps then extending through the respective commutator segments 40″, 41″, etc. and the commutator contact 50. That is, as shown in Fig. 4, for instance, the lamp 30 will be illuminated. The illumination is, however, subdued because of the fact that the resistance R is included in the circuit of the lamps. When the output from the amplifier is large, as in the case of a flaw of large degree, relay 56 will be energized also to close contacts 61 and this has the effect of short-circuiting the resistance R so that whichever lamp is illuminated (in Fig. 4 it is the lamp 30) the illumination will be relatively bright. In this manner the operator can tell at a glance not only the location of a flaw but the relative degree of the defect.

Figure 5:
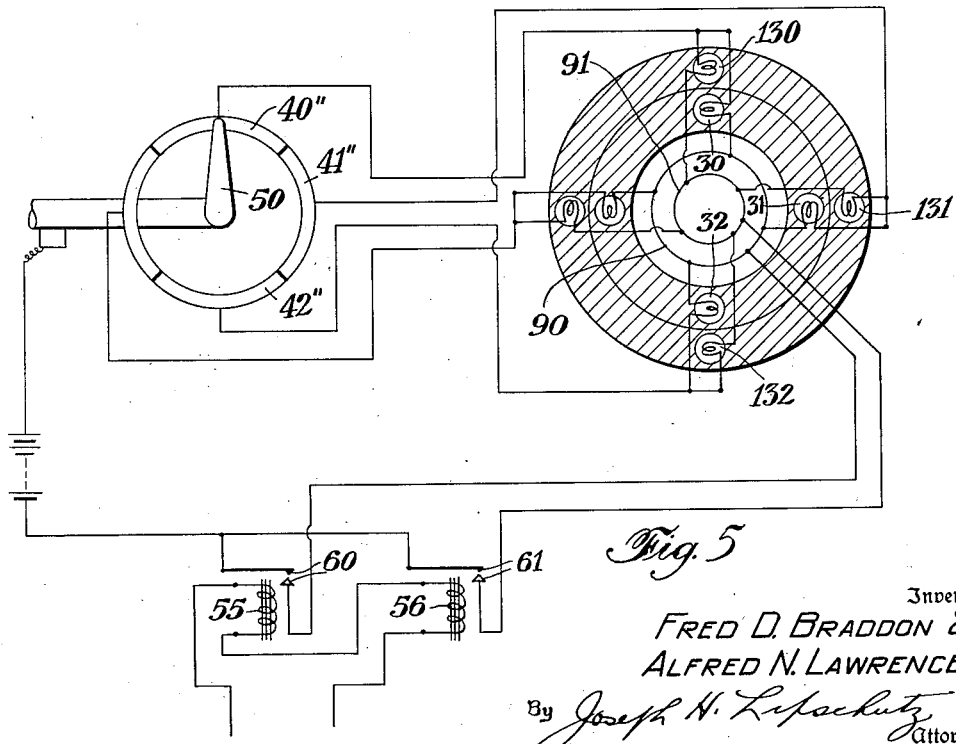
Fig. 5 is a view similar to Figs. 3 and 4 and illustrating still another form of our invention.

In Fig. 5, we have shown a modified form of the invention disclosed in Fig. 4, but instead of varying the degree of illumination of one set of lamps we provide two separate concentric sets of lights 30, 31, 32, etc. and 130, 131, 132, etc. When a flaw of lesser degree is indicated by the output of the amplifier and only relay 55 is energized to close contact 60, the circuit lies through the inner common connection 90 so that only a lamp on the inner row of lamps 30, 31, etc. will be energized; while if the output of the amplifier is sufficiently great to energize also relay 56 to close contact 61, the circuit lies also through the common lead 91 so that a corresponding lamp on the outer row 130, 131, etc. will also be illuminated. In this manner the operator can readily tell merely by the fact that a lamp in one row, or corresponding lamps in two rows have been illuminated, the degree of the defect as well as its location.

In accordance with the provision of the patent statutes, we have herein described the principle and operation of our invention, together with the apparatus which we now consider to represent the best embodiment thereof, but we desire to have it understood that the apparatus shown is only illustrative and that the invention can be carried out by other means. Also while it is designed to use the various features and elements in the combination and relations described, some Having described our invention, what we claim and desire to secure by Letters Patent is:

1. In a flaw detector mechanism for tubular conductors, flaw responsive means, means for causing said responsive means to travel around the periphery of the conductor under test, a plurality of indicators arranged to correspond to the periphery of the conductor under test, and means whereby said responsive means actuates the respective indicator, said means comprising a two-part controller and means whereby one of said parts is operated in synchronism with said responsive means.

2. In a flaw detector mechanism for tubular conductors, flaw responsive means, means for causing said responsive means to travel around the periphery of the conductor under test, a plurality of indicators arranged to correspond to the periphery of the conductor under test, and means whereby said responsive means actuates the respective indicator, said means comprising a two-part controller and means whereby one of said parts is operated in synchronism with said responsive means, the other of said parts comprising a plurality of members corresponding to the respective indicators.

3. In a flaw detector mechanism for tubular conductors, flow responsive means, means for causing said responsive means to travel around the periphery of the conductor under test, a plurality of electrical indicators arranged to correspond to the periphery of the conductor under test, and means whereby said responsive means actuates the respective indicator, said means comprising a two-part controller for controlling the circuits through said indicators, one of said parts comprising a commutator contact, the other of said parts comprising a plurality of contact segments connected to the respective indicators.

4. In a flaw detector mechanism for tubular conductors, flaw responsive means, means for causing said responsive means to travel around the periphery of the conductor under test, a plurality of electrical indicators arranged to correspond to the periphery of the conductor under test, means whereby said responsive means actuates the respective indicator, said means comprising a two-part controller for controlling the circuits through said indicators, one of said parts comprising a commutator contact, the other of said parts comprising a plurality of contact segments connected to the respective indicators, and means whereby said commutator contact is operated in synchronism with said responsive means.

5. In a flaw detector mechanism for tubular conductors, flaw responsive means, means for causing said responsive means to travel around the periphery of the conductor under test, means actuated by said responsive means in accordance with the degree of flaw, means actuated by said responsive means in accordance with the position of flaw on the circumference of said conductor, and indicating means actuated by said two preceding means for indicating the degree and position of flaw.

6. In a flaw detector mechanism for tubular conductors, flaw responsive means, means for causing said responsive means to travel around the periphery of the conductor under test, means actuated by said flaw responsive means for indicating the positions of flaws around the circumference of said conductor, and means simultaneously actuated by said responsive means for indicating the degree of flaw.

7. In a flaw detector mechanism for tubular conductors, flaw responsive means, means for causing said responsive means to travel around the periphery of the conductor under test, means actuated by said flaw responsive means for indicating the positions of flaws around the circumference of said conductor, said last-named means including a plurality of electric lamps arranged to correspond to the periphery of the conductor under test, a two-part controller for the circuits of said lamps, and means whereby one of said parts is operated in synchronism with said responsive means, and means actuated by said flaw responsive means in accordance with the degree of flaw for controlling the quantity of energy flowing in the circuit of said lamps.

8. In a flaw detector mechanism for tubular conductors, flaw responsive means, means for causing said responsive means to travel around the periphery of the conductor under test, means actuated by said flaw responsive means for indicating the positions of flaws around the circumference of said conductor, said last-named means including a plurality of concentric rows each comprising a plurality of electric lamps arranged to correspond to the periphery of the conductor under test, a two-part controller for the circuits of said lamps, and means whereby one of said parts is operated in synchronism with said responsive means, and means actuated by said flaw responsive means in accordance with the degree of flaw for selectively rendering one or more than one of said rows of lamps effective.

9. In a flaw detector mechanism for tubular conductors, flaw responsive means, means for causing said responsive means to travel around the periphery of the conductor under test, degree-of-flaw means actuated by said responsive means in accordance with the degree of flaw, position-of-flaw means actuated by said responsive means in accordance with the position of flaw on the circumference of said conductor, an indicating system comprising a plurality of indicators, means whereby said indicators are adapted to be actuated selectively by said position-of-flaw means, and means whereby the indicator selectively actuated by said position-of-flaw means is jointly and simultaneously actuated by said degree-of-flaw means.

FRED D. BRADDON.
ALFRED N. LAWRENCE.